United States Patent [19]

Takagi

[11] Patent Number: 5,079,492
[45] Date of Patent: Jan. 7, 1992

[54] STABILITY COMPENSATING CIRCUIT

[75] Inventor: Shigeyuki Takagi, Gifu, Japan

[73] Assignee: Teijin Seiki Company Limited, Osaka, Japan

[21] Appl. No.: 531,050

[22] Filed: May 31, 1990

Related U.S. Application Data

[63] Continuation-in-part of Ser. No. 324,802, Mar. 17, 1989, Pat. No. 4,937,512.

[51] Int. Cl.$^5$ .............................................. G05B 6/02
[52] U.S. Cl. ........................................ 318/621; 318/616; 318/563; 364/474.3; 91/361; 91/459
[58] Field of Search ..................... 318/621, 616, 563; 364/474.3; 91/361, 459

[56] References Cited

U.S. PATENT DOCUMENTS

| | | | |
|---|---|---|---|
| 3,199,013 | 8/1965 | Brahm et al. | 318/563 |
| 4,396,975 | 8/1983 | Kurakake | 364/474.3 X |
| 4,642,541 | 2/1987 | El-Sadi | 318/621 X |
| 4,817,498 | 4/1989 | Takagi | 91/361 |
| 4,967,129 | 10/1990 | Tanaka | 318/621 |

Primary Examiner—William M. Shoop, Jr.
Assistant Examiner—Saul M. Bergmann
Attorney, Agent, or Firm—Lane, Aitken & McCann

[57] ABSTRACT

A stability compensating circuit of a servomechanism wherein the output displacement of an actuator is controlled, comprising: a unit generating a reference input signal corresponding to a target value; a first adder which is provided in a first line between the reference input signal generating unit and the actuator and to which a feedback signal from the actuator is inputted through a second line between the first adder and the actuator; a second adder provided in the first line between the first adder and the actuator; a first compensating circuit provided in the first line between the first and second adders; and a second compensating circuit provided in a third line between the second adder and the actuator, the feedback signal from the actuator being inputted to the second adder through the second compensating circuit.

5 Claims, 4 Drawing Sheets

STABILITY COMPENSATING CIRCUIT

This application is a continuation -in- part of application Ser. No. 07/324,802 filed Mar. 17, 1989, now U.S. Pat. No. 4,937,512.

FIELD OF THE INVENTION

The present invention relates in general to stability compensating circuits, and in particular to such circuits applied to electric and hydraulic servomechanisms.

DESCRIPTION OF THE PRIOR ART

An electric and hydraulic servomechanism (hereinafter referred to as a servomechanism) is normally constructed so as to control the position, heading, attitude or the like of an object by the difference (error) between a set target and the actual response. The servomechanism is employed in various controls such as a position or attitude control of ships, aircraft and space satellites, a tool position control of machine tools and the like.

Such a servomechanism is normally operated at relatively high speeds, and therefore it is required to pay attention to the influence of the load system in a static condition, taking account of dynamic characteristics.

The example shown in FIG. 4 is representative for a stability compensating circuit applied to the conventional servomechanism of the above kind. In FIG. 4, the hydraulic pressure of a hydraulic source 1 is supplied through a servo valve 2 to a hydraulic actuator 3 which drives a load 4 in response to rate of flow controlled by the servo valve 2. The servo valve 2 is a kind of an electric-to-hydraulic convertor which is capable of controlling a large hydraulic power by a small electric signal.

The hydraulic actuator 3 is one in which the response is quick, and the load 4 is for example a ladder and the like used as an attitude control of aircraft. The position of the piston of the hydraulic actuator 3 is detected by a position detector 5 which comprises a differential transformer and which converts the detected piston position into an electric signal and which feeds a suitable compensating element back to a command signal to be transmitted to the hydraulic actuator 3. The output of the position detector 5 is inputted to a demodulator 6 which has a filter part removing a noise component and the like of the position detector output. The output of the demodulator 6 is inputted to a subtracter 7 to which a signal from an input-signal generator 8 is also inputted. The input-signal generator 8 is one which generates a reference input signal indicating a target position of the load 4, and the load 4 is servo controlled by the error between the reference input signal and the output signal of the position detector 5 corresponding to the actual position. The subtracter 7 obtains the deflection between the output signal of the input-signal generator 8 and the output signal of the demodulator 6 and outputs the deflection to a second subtracter 9 to which a signal from an electronic model circuit 10 is also inputted. Regarding a system wherein more than two servomechanisms are connected in parallel relationship, the electronic model circuit 10 is adapted to electrically convert the servomechanisms to ideal servomechanisms and transmit as an electric signal to the second subtracter 9. The subtraction of the outputs of the first subtracter 7 and electronic model circuit 10 is made by the second subtracter 9, and is outputted therefrom to a compensation circuit 11. The compensation circuit 11 is one which signal processes the output signal of the second subtracter 9 so that the servomechanism can be stably controlled, and which outputs an output signal to the servo valve 2, and is constructed such that a second order lead circuit or first order lag circuit is employed for example in the servo amplifier. In this example, a second servomechanism 12 is arranged in parallel relationship as an additional servomechanism, and the two servomechanisms are adapted to control the ladder and the like of aircraft.

However, there was the following problem although the second order lead compensation or first order lag compensation has been made in the stability compensating circuit described above.

(I) In the case of the system wherein more than two servomechanisms are connected in parallel relationship, it is impossible to reduce an "amount of conflicting forces" by the error signals of the two servomechanisms. It should here be noted that the "amount of conflicting forces" is defined as follows. For example, in the case the ladder and like of aircraft are servo controlled like the prior art example described above, more than two servomechanisms are always provided from a safety aspect. In this case, the driving force to the load is equally allotted to each of the more than two servomechanisms, and therefore the ladder and the like of aircraft are required to resist against the reaction force of the driving force However, since it is difficult in practice to more perfectly allot equally due to an error of accuracy and the like, the allotted forces become in conflict with each other. Consequently, members supporting the actuators of the servomechanisms are subjected to an excess load which causes fatigue fracture. Since the amount of conflicting forces occurs due to the error of each component of the servomechanisms and particularly is determined by the stiffness of each servomechanism, it is preferable that the rigidities be smaller. Thus, it is necessary to reduce the amount of conflicting forces in order to avoid fatigue fracture.

On the other hand, in the feedback method of the error signal of the electronic model circuit there are the following problems.

(II) If the servomechanisms including the load system are electrically converted to ideal servomechanisms, the production cost is greatly increased, since the circuit becomes extremely complicated.

(III) Since the influence of the deviation of the component constant of the servomechanisms, particularly the natural frequency of the load system, upon the safety is extremely high, there is room for improvement as to stable servo control.

(IV) For the reasons stated above, in the case safety is compensated, on the other hand, the limit value of response is low, and also, the reduction effect of the amount of the conflicting forces by the error signal of the two system is very small.

Accordingly, it is an object of the present invention to provide an improved safety compensating circuit wherein the aforementioned amount of conflicting forces is reduced, while the safety is being compensated with low cost and by a simpler electronic circuit.

SUMMARY OF THE INVENTION

In accordance with one important aspect of the present invention, there is provided a stability compensating circuit of a servomechanism wherein the output displacement of an actuator is controlled, comprising: means generating a reference input signal corresponding to a target value; a first adder which is provided in a first line between the reference input signal generating means and the actuator and to which a feedback signal from the actuator is inputted through a second line between the first adder and the actuator; a second adder provided in the first line between the first adder and the actuator; a first compensating circuit provided in the first line between the first and second adders; and a second compensating circuit provided in a third line between the second adder and the actuator, the feedback signal from the actuator being inputted to the second adder through the second compensating circuit.

BRIEF DESCRIPTION OF THE DRAWINGS

The above and other objects and advantages will become apparent from the following detailed description when read in conjunction with the accompanying drawings wherein.

DESCRIPTION OF THE PREFERRED EMBODIMENT

Prior to the description of an embodiment of the present invention, the principle of the present invention will now be described, making reference to FIG. 1.

Figure 1:
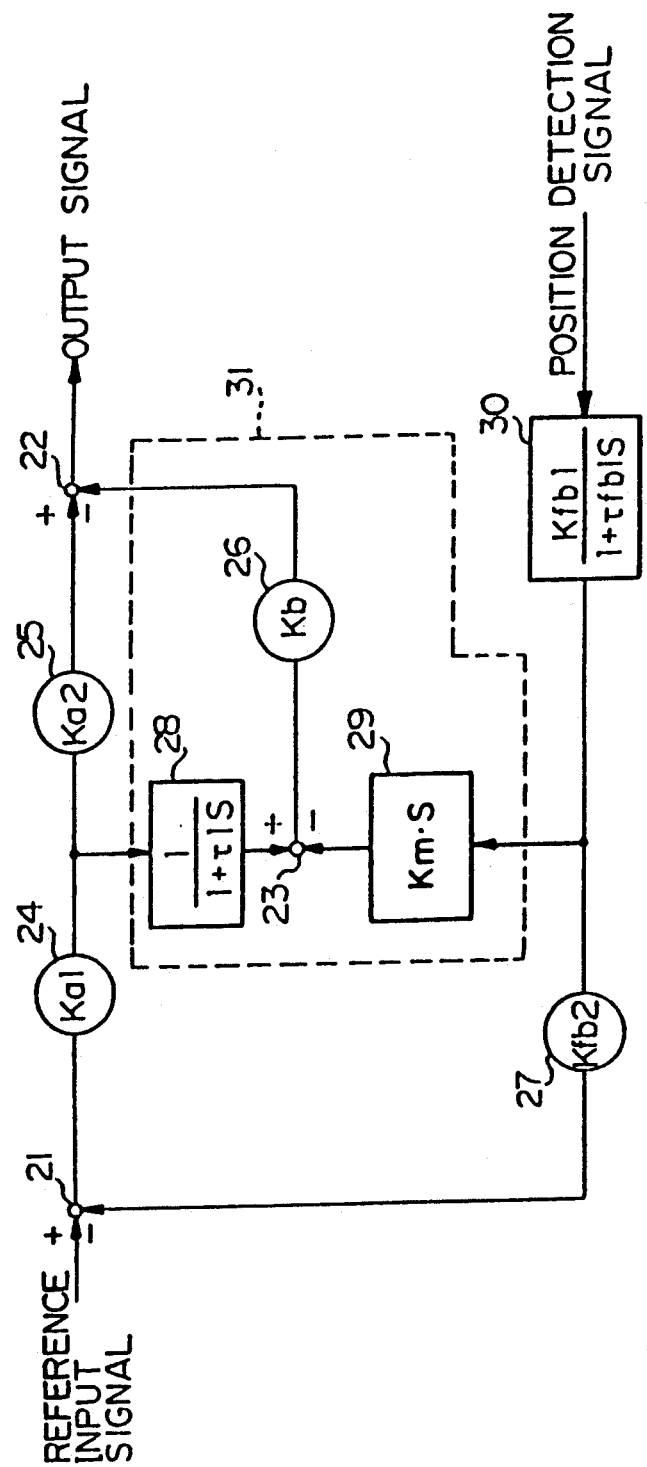
FIG. 1 is a block diagram schematically illustrating the principle of the present invention.

In FIG. 1, first, second and third summing amplifiers for adding and subtracting inputs are designated by reference numerals 21, 22 23, a primary amplifier by reference numeral 24, a secondary amplifier by reference numeral 25, and first and second feedback amplifiers by reference numerals 26 and 27. The gain constants of the amplifiers 24, 25, 26 and 27 are Ka1, Ka2, Kb and Kfb2, respectively. Designated by reference numeral 28 is a first order lag circuit (lag means), and the transfer function thereof is $1/(1 + \tau 1 S)$. Reference numeral 29 indicates a differential circuit (differential means) and the transfer function thereof is Km·S. It is noted that a first order lag circuit whose transfer function is $1/(1 + \tau \cdot S)$ may be provided in the input or output side of the differential circuit 29. Designated by reference numeral 30 is a filter circuit and the transfer function thereof is $Kfb1/(1 + \tau fb1 \, S)$. The present invention is incorporated into a compensation circuit 31 enclosed by dot lines indicated in FIG. 1.

Figure 4:
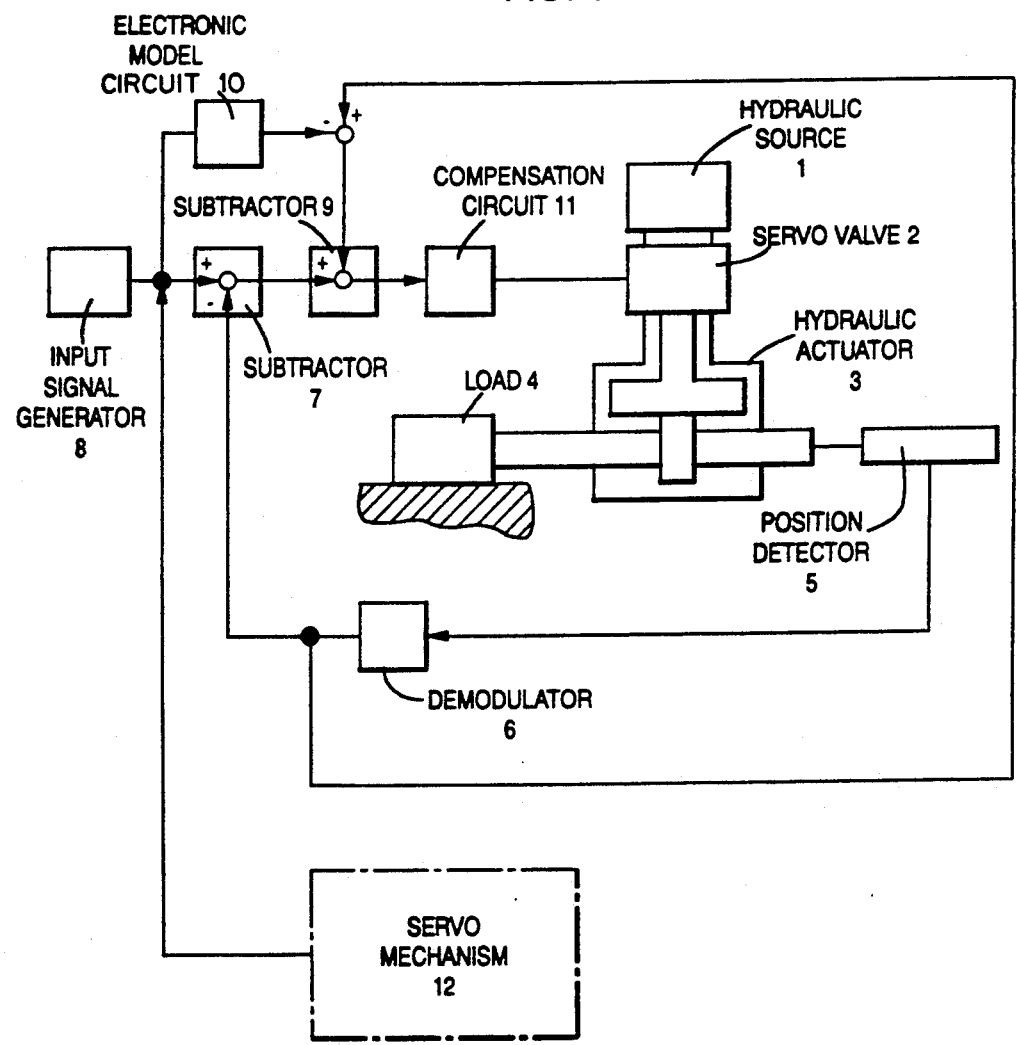
FIG. 4 is a block diagram showing the conventional servomechanism.

The flow of signal will be now described. A reference input signal (corresponding to a target position) and the output signal of the second feedback amplifier 27 are subtracted at the first summing amplifier 21 and amplified through the primary and secondary amplifiers 24 and 25 and transmitted to the second summing amplifier 22. Also, the output of the primary amplifier 24 is first-order lag treated by the first order lag circuit 28 and supplied to the third summing amplifier 23 to which is further supplied the output of the filter circuit 30 differentiated by the differential circuit 29. The third summing amplifier 23 then obtains the difference between the outputs of the first order lag circuit 28 and the differential circuit 29 and transmits its output signal through the first feedback amplifier 26 to the second amplifier 22 which will feed its output signal to the compensation circuit 11 as shown in FIG. 4.

Therefore, since the output of the differential circuit 29 becomes substantially zero in the static condition, the servo amplifier gain will be Ka1 · (Ka2 − Kb) and thus reduced. In this case, the influence of the aforementioned amount of conflicting forces is particularly large at the static condition, while the influence is small at the dynamic condition. That is, in the above case, the stiffness of the servomechanism will be decreased as the servo amplifier gain is reduced. Therefore, the amount of conflicting forces determined by the stiffness becomes necessarily smaller, and the problem caused thereby will be eliminated.

On the other hand, since in the dynamic condition (particularly, low frequency region) the influence of the load system is small, the output of the first order lag circuit 28 and the output of the differential circuit 29 become substantially the same signals and thus the output of the third summing amplifier 23 becomes substantially zero. For this reason, the servo amplifier gain becomes Ka1 · Ka2 and higher as compared with the above static condition, and the higher response is thus obtained.

Also, since, in the high frequency region of the dynamic condition (for example, in the neighborhood of the natural frequency of the load system), the output of the differential circuit 29 becomes greater than the output of the first order lag circuit 28, this acts as damping, thereby increasing the stability. That is, if the servo amplifier gain remains higher, there will be caused hunting.

Thus, the stability compensating circuit of the present invention increases its response, compensating the stability with the simple electronic circuit, and also enhances the reduction effect of the amount of conflicting forces.

Figure 2:
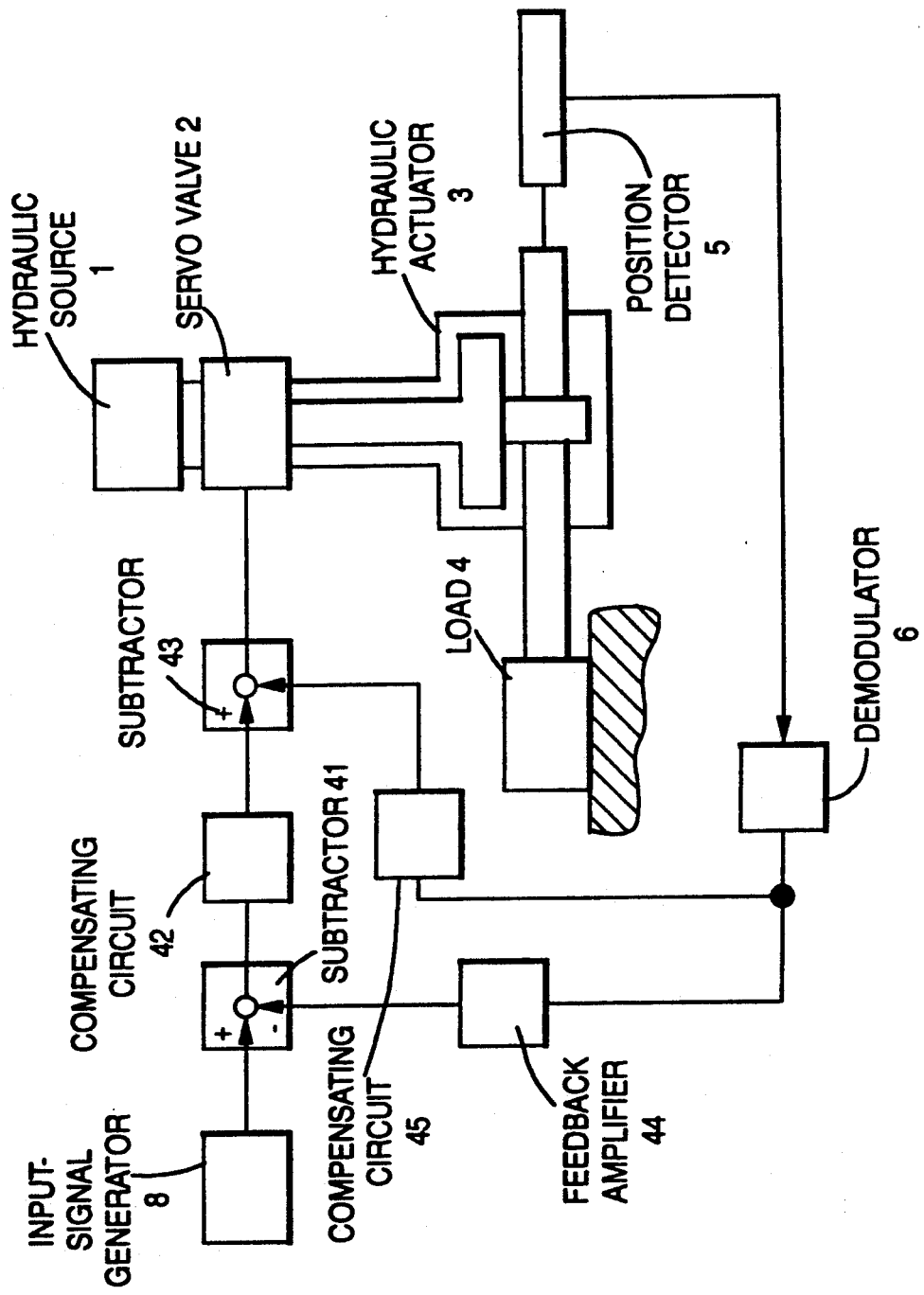
FIG. 2 is a schematic block diagram showing a servomechanism into which a stability compensating circuit according to the present invention is incorporated.
Figure 3A:
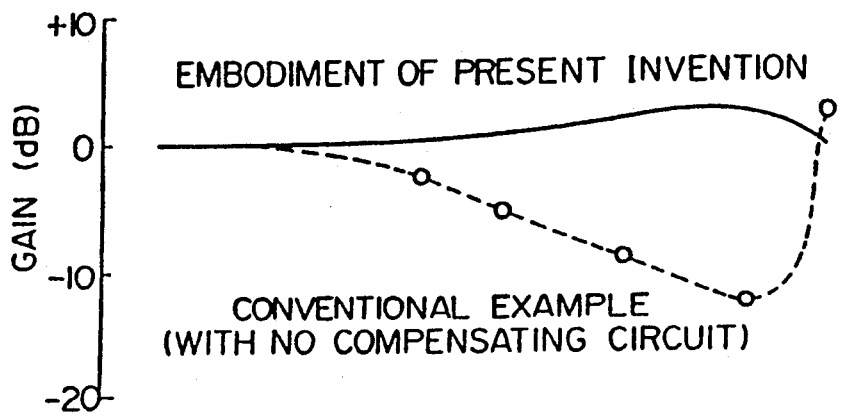
FIG. 3A is a diagram showing the gain characteristic obtained in accordance with the embodiment of FIG. 2 and the gain characteristic obtained by the conventional servomechanism of FIG. 4.
Figure 3B:
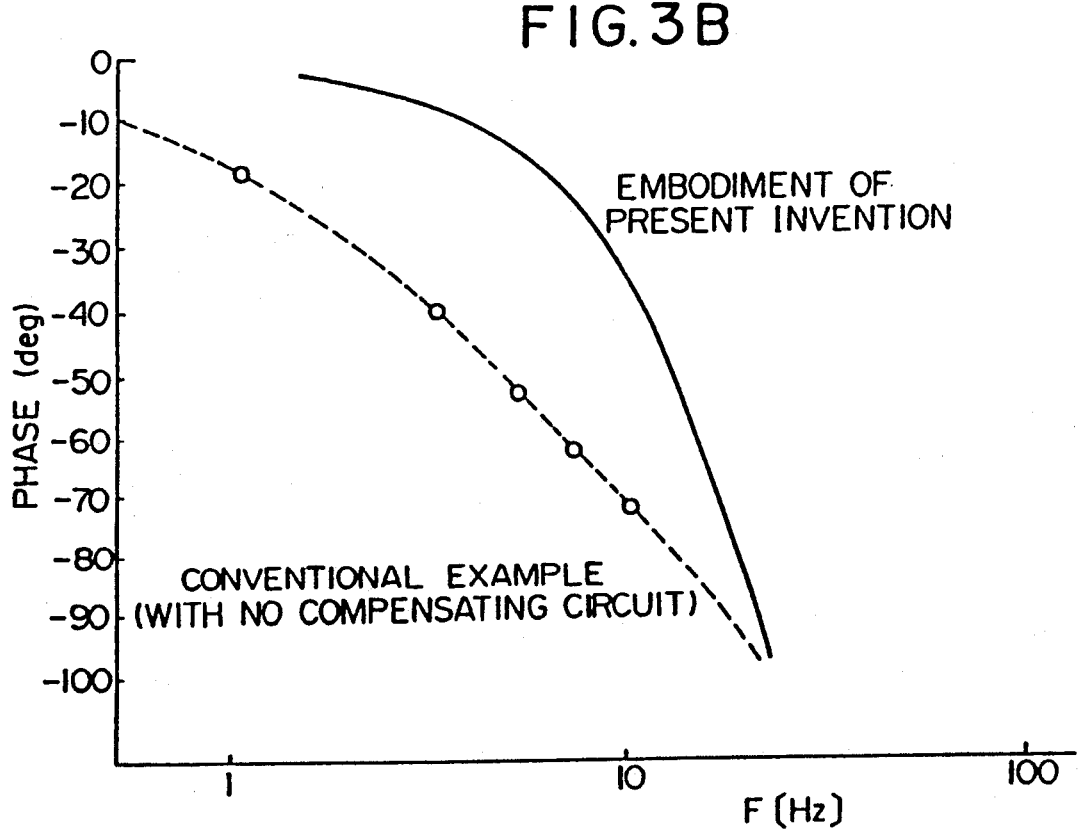
FIG. 3B is a view similar to FIG. 3A showing the phase characteristic obtained in accordance with the embodiment of FIG. 2 and the phase characteristic obtained by the conventional servomechanism of FIG. 4.

Referring to FIGS. 2 and 3, there is shown a preferred embodiment of a stability compensating circuit according to the present invention which is applied to a servomechanism. The parts substantially identical to those of the conventional servomechanism of FIG. 4 are designated by like reference numerals for avoiding the description thereof.

In FIG. 2, an input-signal generator is designated by reference numeral 8, a first adder by 41, a first compensating circuit by 42, a second adder by 43, a feedback amplifier by 44, and a second compensating circuit by 45. The structure of FIG. 2 is equivalent in principle to that of FIG. 1. Therefore, the first adder 41 has a function corresponding to the first summing amplifier 21 of FIG. 1, and the first compensating circuit 42 has a function corresponding to the primary amplifier 24, secondary amplifier 25, first order lag circuit 28, first feedback amplifier 26 and to the second summing amplifier 22 of FIG. 1. The second adder 43 has a function corresponding to the second summing amplifier 22 of FIG. 1, and the second feedback amplifier 44 has a function corresponding to the second feedback amplifier 27 of FIG. 1. The second compensating circuit 45 has a function corresponding to the differential circuit 29, third summing amplifier 23, first feedback amplifier 26 and to the second summing amplifier 22 of FIG. 1, and a demodulator 6 has a function corresponding to the filter circuit 30 of FIG. 1. Therefore, the description of each function will be omitted.

Next, the operation will be described.

The input-signal generator 8 transmits a reference input signal through the first adder 41, first compensating circuit 42 and second adder 43 to a servo valve 2 so that the valve can be driven. The displacement of the piston of an actuator 3 driven by the servo valve 2 is detected by a position detector 5. The detected displacement is transmitted through the demodulator 6 and feedback amplifier 44 to the first adder 41 so that the actuator piston displacement can be feedback controlled. On the other hand, the output of the demodulator 6 is also inputted through the second compensating circuit 45 to the second adder 43 so that positive feedback can be made.

The first compensating circuit 42 comprises a first order lead and lag circuit, and the transfer function G1(S) is defined as follows:

$$G1(S) = Kx(1+\tau b\, S)/(1+\tau a\, S)$$

wherein the $Kx = Ka1\, Ka2 / (1 + Ka2\, Kb)$, $\tau b = \tau 1$, $\tau a = \tau 1 / (1 + Ka2\, Kb)$, and the S indicates a differential operator.

On the other hand, the second compensating circuit 45 comprises a first order lag plus differentiation circuit, and the transfer function G2(S) is defined as follows:

$$G2(S) = KgS/(1+\tau cS)$$

wherein the $Kg = Km\, \tau 2\, Kb / (Ka1\, Ka2)$, the $\tau c = \tau 1$, and the S indicates a Laplace complex variable. In addition, the transfer function of the output signal of the second adder 43 to the output signal of the input-signal generator 8 of FIG. 2 is equivalent to that of the output signal to the reference input signal of FIG. 1, and the transfer function of the output signal of the second adder 43 to the output signal of the position detector 5 of FIG. 2 is equivalent to that of the output signal to the position detection signal of FIG. 1.

The embodiment shown in FIG. 2 can also obtain the same effect in accordance with the aforementioned principle of the present invention. It will be seen from FIGS. 3A and 3B that the effect of the embodiment (with compensation system) according to the present invention is clearly different from that of the convention example (with no compensation system).

As previously described, in the case of more than two servomechanisms arranged in parallel relationship, the conflicting forces occur due to the error of each component, but the amount of conflicting forces can be reduced in accordance with the present invention as follows.

The amount of conflicting forces is determined by the stiffness of the servomechanism, and how the stiffness of the servomechanism according to the present invention varies as compared with that of the conventional example is indicated by the following equations:

(1) the conventional example (with no compensating system): the stiffness of the servomechanism Kt1 will be $Kt1 = 1/(1/Kstr + 1/Kout + 1/Kact)$ wherein the Kstr indicates the stiffness of the actuator mounting portion, the Kout the stiffness of the actuator output portion and the Kact the stiffness of the actuator, and the amount of conflicting forces Kact1 will be $$Kact1 = Ap\cdot Kpo\cdot Ka1\cdot Ka2\cdot Kfb2\cdot Kfb1$$

wherein the Ap indicates the pressure receiving area of the piston of the actuator and the Kpo indicates the pressure gain of the servo valve.

(2) the embodiment of the present invention (with compensating system): the amount of conflicting forces Kact2 will be $$Kact2 = Ap\cdot Kpo\cdot Ka1(Ka2 - Kb)\cdot Kfb2\cdot Kfb1.$$

Therefore, the amount of conflicting forces Kact2 according to the present invention will be (Ka2 − Kb)/Ka2 times that of the conventional example. Consequently, the stiffness of the servomechanism is reduced and the amount of conflicting forces thus significantly reduced.

As described above, the following effects can be obtained in accordance with the present invention.

(I) Even in the case of a system wherein more than two servomechanisms are connected in parallel relationship, the amount of conflicting forces can be greatly reduced. Consequently, the stiffness of the actuator mounting portion can be reduced and also the fatigue fracture of that portion can be prevented effectively.

(II) Since it is not necessary to provide an electronic model circuit which has been provided in the servomechanisms connected in parallel relationship, the production cost can be greatly reduced.

(III) Since the influence caused by the deviation of the various component constants is small as compared with the method wherein the amount of conflicting forces is reduced by the conventional electronic circuit model, a stable control can be performed, reducing the amount of conflicting forces.

(IV) The responsibility can be enhanced, compensating the stability.

While the subject invention has been described with relation to the preferred embodiment thereof, various modifications and adaptations thereof will now be apparent to those skilled in the art. All such modifications and adaptations as fall within the scope of the appended claims are intended to be covered thereby.

What I claim is:

1. A stability compensating circuit of a servomechanism wherein the output displacement of an actuator is controlled, comprising:

means generating a reference input signal corresponding to a target value;

a first adder which is provided in a first line between said reference input signal generating means and said actuator and to which a feedback signal from said actuator is inputted through a second line between said first adder and said actuator;

a second adder provided in said first line between said first adder and said actuator;

a first compensating circuit provided in said first line between said first and second adders; and a second compensating circuit provided in a third line between said second adder and said actuator, said feedback signal from said actuator being inputted to said second adder through said second compensating circuit.

2. A stability compensating circuit as set forth in claim 1, wherein said first compensating circuit comprises a first order lead and lag circuit and said second compensating circuit comprises a first order lag plus differentiation circuit.

3. A stability compensating circuit of a servomechanism wherein the output displacement of an actuator is controlled, comprising a circuit equivalent to a principle circuit which includes means generating a reference input signal corresponding to a target value;

first summing means to which said reference input signal and a signal corresponding to the actual output displacement of said actuator are inputted;

primary amplifying means to which an output of said first summing means is inputted and which amplifies said output of said first summing means;

secondary amplifying means to which an output of said primary amplifying means is inputted and which further amplifies said output of said primary amplifying means;

second summing means to which an output of the secondary amplifying means is inputted; wherein said stability compensating circuit further comprises first order lag means to which said output of said primary amplifying means is also inputted and whose output lags said output of said primary amplifying means; and differential means differentiating said signal corresponding to the actual output displacement of said actuator; and third summing means to which an output of said first order lag means and an output of said differential means are inputted and which transmits to said second summing means the difference between said outputs of said first order lag means and said differential means;

said second summing means outputting the error between said output of said secondary amplifying means and said difference, to control said output displacement of said actuator.

4. A stability compensating circuit as set forth in claim 3, wherein said equivalent circuit comprises means generating a reference input signal corresponding to a target value;

a first adder which is provided in a first line between said input signal generating means and said actuator and to which a feedback signal from said actuator is inputted through a second line between said first adder and said actuator;

a second adder provided in said first line between said first adder and said actuator;

a first compensating circuit provided in said first line between said first and second adders; and a second compensating circuit provided in a third line between said second adder and said actuator, said feedback signal from said actuator being inputted to said second adder through said second compensating circuit.

5. A stability compensating circuit as set forth in claim 4, wherein said first compensating circuit comprises a first order lead and lag circuit and said second compensating circuit comprises a first order lag plus differentiation circuit.

* * * * *